Jan. 21, 1964 F. J. IZZO 3,118,150
FOLDING CAR BED PLATFORM
Filed Jan. 23, 1963 2 Sheets-Sheet 1
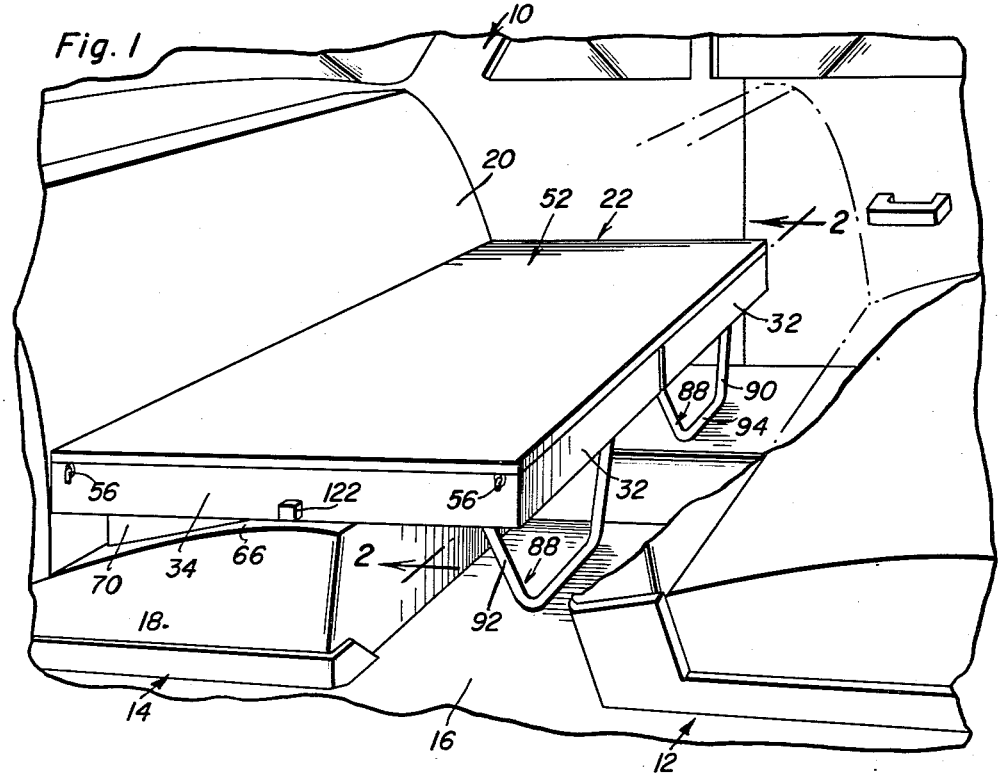
Frank J. Izzo
INVENTOR.

Jan. 21, 1964 F. J. IZZO 3,118,150
FOLDING CAR BED PLATFORM
Filed Jan. 23, 1963 2 Sheets-Sheet 2
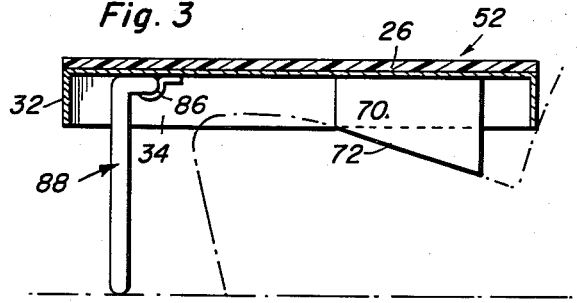
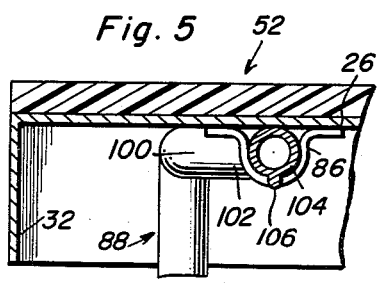
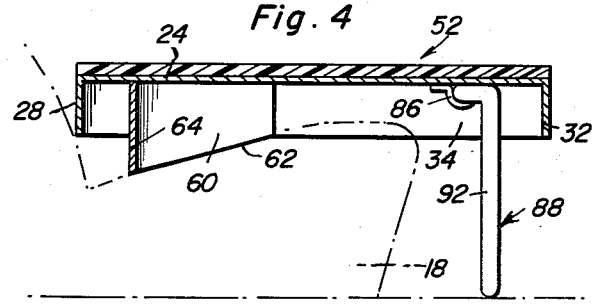
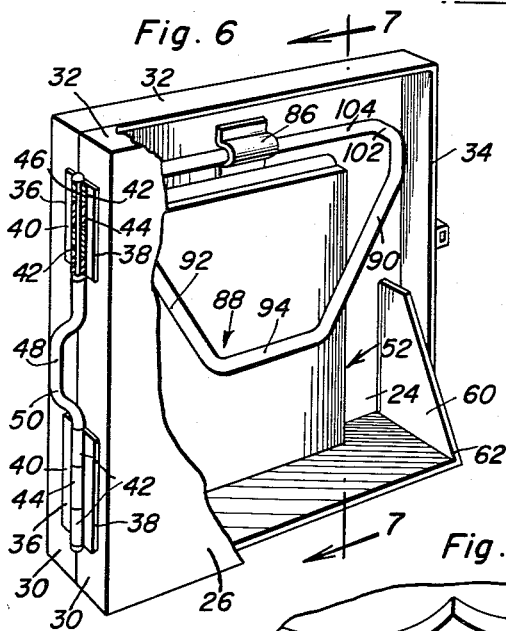
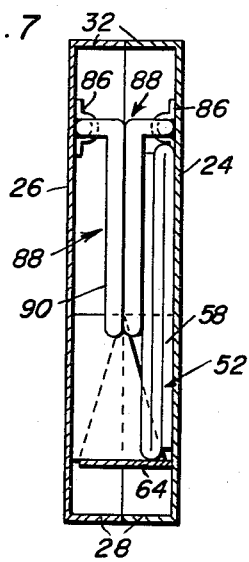
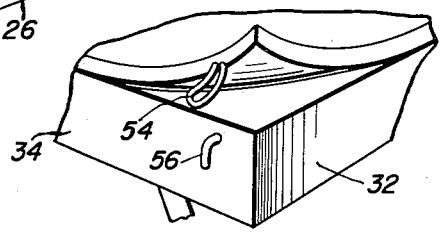
Frank J. Izzo
INVENTOR.

United States Patent Office 3,118,150
Patented Jan. 21, 1964

3,118,150
FOLDING CAR BED PLATFORM
Frank J. Izzo, 342 W. Catawissa St., Nesquehoning, Pa.
Filed Jan. 23, 1963, Ser. No. 253,404
13 Claims. (Cl. 5—118)

The invention relates to a novel and useful folding car bed platform and more specifically to a platform which is intended for use in any make of automobile or other vehicles that may be adapted to receive the car bed platform.

The platform is to be utilized as a sleeping bed for children or as a storage platform and is constructed in a manner enabling it to be placed in the rear seat section of a vehicle and disposed in a manner so as to extend longitudinally of the rear seat cushion with one longitudinal edge portion thereof projecting outwardly over the floor of the vehicle. The platform includes foldable leg means which may be pivoted to the extended position and engaged with the floor of the rear seat portion of the vehicle in order to support the longitudinal edge portion of the platform which projects outwardly over the floor. The opposite marginal edge portion of the platform is supported from the seat by means of wedge-shaped foot members which depend downwardly from the platform and are provided with inclined lower surfaces adapted to conform and engage the rearwardly and downwardly inclined surface of the rear seat cushion. The platform is provided with a foldable pad or cover which may be secured to the platform in a manner to prevent its shifting relative to the platform.

The platform is constructed somewhat like a conventional suitcase including two half sections pivotally secured together that may be swung 180° relative to each other between an extended position with the two halves of the platform substantially co-planar and a folded position with the two half sections of a platform substantially parallelling each other and defining a closed housing in which to completely receive the legs when in the folded position and the pad or cover when the latter is also folded.

In this manner, the platform of the instant invention may be stored in a compact state and may be readily handled during transportation from one location to another.

The main object of this invention is to provide a folding car bed or platform which may be readily erected in the rear seat portion of a vehicle so as to form a horizontally disposed platform of considerable plan area and suitable for functioning as a bed for children or as a storage platform.

Another object of this invention, in accordance with the immediately preceding object, is to provide a device constructed in a manner whereby it may be readily folded into a compact state in order that it may be readily handled when not in use and stored in a limited area.

Still another object of this invention is to provide a platform in accordance with the preceding objects whose pivoted leg members are provided with foot assemblies comprising a pair of interlocked and readily releasable foot members which are pivotally secured at one end of the stack to the free end of the corresponding leg for rotation about an axis generally parallelling that leg. In this manner, the foot members are readily adaptable to conforming to vehicle floors which are inclined about an axis extending transversely of the vehicle.

Another object of this invention, in accordance with the immediately preceding object, is to provide a foot assembly including stacked foot members which are releasably interlocked with each other in a manner enabling a desired number of the foot members to be removed from the stack in order to vary the effective length of the legs to which the foot assemblies are secured whereby the legs of the platform will be readily adjustable to compensate for varying distances between the upper surfaces of the vehicle seat cushions and the corresponding floor portions disposed immediately forwardly of the seat cushions.

A final object of this invention to be specifically enumerated herein is to provide a folding car bed or platform which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the interior of a conventional form of passenger motor vehicle shown with the folding car bed or platform of the instant invention erected over and supported from the rear seat cushion and the rear floor of the vehicle, portions of the front seat being broken away and shown in phantom lines;

FIGURE 2 is an enlarged longitudinal vertical sectional view of the platform taken substantially upon the plane indicated by the section line 2—2 of FIGURE 1;

FIGURE 3 is a transverse sectional view taken substantially upon the plane indicated by the section line 3—3 of FIGURE 2;

FIGURE 4 is a transverse vertical sectional view taken substantially upon the plane indicated by the section line 4—4 of FIGURE 2;

FIGURE 5 is an enlarged view of the upper left hand portion of FIGURE 3 with a portion of the leg shown being broken away and shown in section;

FIGURE 6 is a perspective view of the car bed or platform shown in a folded state with portions thereof being broken away;

FIGURE 7 is a transverse vertical sectional view taken substantially upon the plane indicated by the section line 7—7 of FIGURE 6;

FIGURE 8 is a fragmentary enlarged perspective view of one corner of the car bed or platform showing the manner in which the cover or pad may be secured thereto;

FIGURE 9 is a fragmentary front elevational view of one of the legs of the platform showing the manner in which the foot assembly may be utilized in order to increase the effective length of the leg; and FIGURE 10 is an enlarged fragmentary vertical sectional view taken substantially upon the plane indicated by the section line 10—10 of FIGURE 9.

Referring now more specifically to the drawings, the numeral 10 generally designates a conventional form of passenger vehicle which includes a front seat assembly generally referred to by the reference numeral 12 and a rear seat assembly generally referred to by the reference numeral 14. The vehicle 10 also includes a flooring panel 16 and it may be seen that the rear seat assembly 14 includes a rear seat cushion 18 and a rear seat back rest 20.

The car bed or platform of the instant invention is generally designated by the reference numeral 22 and includes a pair of generally rectangular panel-like members 24 and 26. The panel-like members 24 and 26 each include four laterally directed peripheral walls 28, 30, 32 and 34 disposed at substantially right angles relative to each other and interconnected at adjacent ends.

The peripheral walls 30 are pivotally secured together at their free edge portions by means of hinge assemblies 36. Each hinge assembly includes a pair of hinge plates 38 and 40 secured to corresponding portions of the peripheral walls 30 and axially aligned sleeves 42 and 44. The corresponding sets of the sleeves 42 and 44 have an axle pin 46 passed therethrough carried by the corresponding end of a handle 48. The axle pins 46 are axially aligned and interconnected by means of a U-shaped hand grip portion 50 of the handle 48. Accordingly, it may be seen that corresponding ones of the hinge plates or leaves 38 and 40 are pivotally secured together and that the handle 48 is also pivotally supported for rotation about the axle pins 46.

From a comparison of FIGURES 2 and 6, it will be seen that the platform 22 may be disposed in an unfolded position with the panel-like members 24 substantially co-planar and also in a folded position with the panel-like members 24 and 26 generally paralleling each other and the free ends of corresponding ones of the peripheral walls 28, 30, 32 and 34 abutting each other to form a hollow receptacle.

A cover or pad of resilient material is generally referred to by the reference numeral 52 and is of the size to conform to the size and shape of the platform 22 when it is in the unfolded position. The opposite ends of the pad 52 include elastic loops 54 which may be engaged with L-shaped anchors 56 secured in the outer surfaces of corresponding ones of the peripheral walls 34. In this manner, the pad 52 is secured over the outer surfaces of the panel-like members 24 and 26.

With attention now directed to FIGURES 3, 4, and 6 of the drawings, it may be seen that the panel-like member 24 is provided with a pair of wedge-shaped feet 58 and 60 which generally parallel each other and extend transversely of the peripheral walls 28 and 32. The wedge-shaped feet 58 and 60 include inclined lower surfaces 62 and they are interconnected at their major end portions by means of a transverse member 64. The wedge-shaped feet 58 and 60 and the transverse member 64 are secured to the inner surface of the panel-like member 24. It may be seen that the inclined surfaces 62 conform to the rearwardly and downwardly inclined upper surface 66 of the rear seat cushion 18. The panel-like member 26 includes a pair of wedge-shaped feet 68 and 70 and also inclined lower surfaces which are designated by the reference numerals 72. The wedge-shaped feet 68 and 70 are secured to the inner surface of the panel-like member 26 and also to the inner surfaces of the peripheral walls 34 and 30 supported from the panel-like member 26.

It will be noted that the wedge-shaped feet 58, 60, 68 and 70, each project from the corresponding panel-like member, at their major end portions, a distance slightly less than the total distance between the panel-like members 24 and 26 when they are disposed in the folded positions. In this manner, the wedge-shaped feet may be received within the confines of the hollow recaptacle formed by the platform 22 when it is in its folded position. Further, inasmuch as the pad 52 is foldable, it may be folded and stored within the receptacle and between the opposing surfaces of the wedge-shaped feet 58 and 60.

With attention now invited to FIGURES 2 and 5 of the drawings, it may be seen that a pair of U-shaped journals 84 and 86 are secured to the undersurfaces of the panel like members 24 and 26. Each of the panel-like members 24 and 26 includes a leg assembly generally referred to by the reference numeral 88 and each leg assembly 88 includes a pair of downwardly convergent legs 90 and 92 interconnected at their lower ends by means of a transverse bight portion 94. The upper ends of the legs 90 and 92 each include an angulated portion 96 and the angulated portions 96 of each leg assembly 88 are generally parallel. The upper ends of the angulated portions 96 are interconnected by means of a generally U-shaped bight portion 100 including a pair of legs 102 interconnected by means of a transverse member 104. The medial plane of the U-shaped bight portion 100 is disposed at substantially right angles to the plane containing the corresponding legs 90 and 92. Accordingly, it may be seen that each leg assembly 88 is generally L-shaped and that the legs 90 and 92 of each leg assembly 88 define the long leg thereof while the U-shaped bight portion 100 thereof defines the short leg of that L-shaped leg assembly.

The transverse member 104 of each leg assembly 88 is rotatably received through the corresponding sleeve and each transverse member 104 includes a pair of ears 106 disposed at opposite ends of the corresponding sleeve whereby that transverse member 104 will be prevented from shifting axially of the corresponding sleeve.

With attention now directed more specifically to FIGURES 9 and 10 of the drawings, there will be seen a foot assembly generally referred to by the reference numeral 110 which includes a plurality of releasably interlocked and stacked foot members 112, 114, and 116. Each of the stacked foot members 116 includes an upwardly opening recess which more than half way encircles and rotatably receives the corresponding bight portion 94. Each foot member 116 also includes a dove-tailed projection 120 which is slidingly received in a dove-tailed recess 122 formed in the foot member 114 disposed therebeneath. Each of the foot members 114 includes a recess 122 and a dove-tailed projection 124 disposed in the dove-tailed recess disposed therebeneath. The lowermost foot member 112 includes a dove-tailed recess 126 which receives the dove-tailed projection 124 on the lowermost foot member 114. The lower surface of the foot member 112 is substantially planar for abutting engagement with the floor 16 of the vehicle 10.

Inasmuch as the projections 120 and 124 are similar and the recesses 122 and 126 are also similar, the effective length of each leg assembly 88 may be adjusted by removing or adding the desired number of foot members 114 between the corresponding foot members 112 and 116. Additionally, inasmuch as the recess 118 formed in the foot member 116 rotatably receives the corresponding bight portion 94, the foot assemblies 110 may be rotated about the longitudinal axis of the corresponding bight portions 94 in order to adapt the foot assemblies to conform to the vehicle flooring sections which may be inclined about an axis extending transversely of the corresponding vehicle.

The free edges of the peripheral walls 34 are provided with co-acting latch members 120 and 122 for releasably securing the panel like members 24 and 26 in the folded position illustrated in FIGURES 6 and 7 of the drawings.

It is to be noted that the panel like members 24 and 26 and their corresponding peripheral walls may be formed of any convenient material and that the wedge-shaped feet may also be constructed of any suitable material. The leg assemblies 88 are preferably constructed of lightweight metal such as aluminum and the foot assemblies 110 can be constructed of any suitable material such as hard rubber or the like. The pad 52 may of course be constructed of a soft deformable material if the platform 10 is to be utilized as a car bed or it may be constructed of a tough wear resistant material in the event the platform 10 is to be utilized as a support bed for various types of loads to be carried in the vehicle 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A folding car bed platform comprising a pair of similar panel-like members, means pivotally securing said panel-like members together for rotation relative to each other about an axis generally paralleling one pair of corresponding edge portions of said members between unfolded positions in substantially coplanar relation and with one pair of corresponding edge portions disposed in opposed relation and folded positions with said members generally paralleling and registered with each other, a pair of leg means pivotally secured to a second pair of corresponding edge portions of said members at corresponding ends for rotation about axes which are generally aligned when said members are in the extended positions and which extend transversely of the first-mentioned axis at all times, said members each including a wedge-shaped foot generally parallelling said axis and projecting outwardly from the corresponding one of said first sides, said feet including inclined faces extending longitudinally thereof, facing away from said one sides, and inclined away from said one sides at the end thereof remote from said second pair of corresponding edge portions of said members, said inclined faces being adapted to rest upon the upper surface of a vehicle rear seat cushion extending from front to rear thereof and with the major end portion of said wedge-shaped feet disposed rearmost on said cushion.

2. A folding car bed platform comprising a pair of similar panel-like members, means pivotally securing said panel-like members together for rotation relative to each other about an axis generally paralleling one pair of corresponding edge portions of said members between unfolded positions in substantially coplanar relation and with one pair of corresponding edge portions disposed in opposed relation and folded positions with said members generally paralleling and registered with each other, a pair of leg means pivotally secured to a second pair of corresponding edge portions of said members at corresponding ends for rotation about axes which are generally aligned when said members are in the extended positions and which extend transversely of the first-mentioned axis at all times, a plurality of releasably interlocked and stacked foot members pivotally secured at one end of the stack of foot members to each of the free ends of said leg means for rotation about an axis generally parallelling the axis of rotation of that leg means.

3. The combination of claim 2 including a foldable cover pad of a size and shape corresponding to that of the platform formed by said panel-like members when in the unfolded positions, and means removably securing said pad over the sides of said members remote from said first sides thereof at the opposite ends of said platform.

4. The combination of claim 3 wherein said pad, when folded, and said leg means, when retracted, are receivable between said first sides of said members when the latter are in their folded positions.

5. A folding car bed platform comprising a pair of similar panel-like members, means pivotally securing said panel-like members together for rotation relative to each other about an axis generally paralleling one pair of corresponding edge portions of said members between unfolded positions in substantially coplanar relation and with one pair of corresponding edge portions disposed in opposed relation and folded positions with said members generally paralleling and registered with each other, a pair of leg means pivotally secured to a second pair of corresponding edge portions of said members at corresponding ends for rotation about axes which are generally aligned when said members are in the extended positions and which extend transversely of the first-mentioned axis at all times, said panel-like members each including four laterally directed peripheral walls disposed at substantially right angles relative to each other and interconnected at adjacent ends, corresponding ones of said peripheral walls having a total width equal to the distance between said panel-like members when the latter are in the folded positions whereby said peripheral walls and said panel-like members together from a closed hollow receptacle in which to enclose said leg means when said panel members are in the folded positions.

6. A folding car bed platform comprising a pair of similar panel-like members, means pivotally securing said panel-like members together for rotation relative to each other about an axis generally paralleling one pair of corresponding edge portions of said members between unfolded positions in substantially coplanar relation and with one pair of corresponding edge portions disposed in opposed relation and folded positions with said members generally paralleling and registered with each other, a pair of leg means pivotally secured to a second pair of corresponding edge portions of said members at corresponding ends for rotation about axes which are generally aligned when said members are in the extended positions and which extend transversely of the first-mentioned axis at all times, said members each including a wedge-shaped foot generally parallelling said axis and projecting outwardly from the corresponding one of said first sides, said feet including inclined faces extending longitudinally thereof, facing away from said one sides, and inclined away from said one sides at the end thereof remote from said second pair of corresponding edge portions of said members, said inclined faces being adapted to rest upon the upper surface of a vehicle rear seat cushion extending from front to rear thereof and with the major end portions of said wedge-shaped feet disposed rearmost on said cushion, said wedge-shaped feet being spaced laterally of each other when said panel-like members are folded.

7. A folding car bed platform comprising a pair of similar panel-like members, means pivotally securing said panel-like members together for rotation relative to each other about an axis generally paralleling one pair of corresponding edge portions of said members between unfolded positions in substantially coplanar relation and with one pair of corresponding edge portions disposed in opposed relation and folded positions with said members generally paralleling and registered with each other, a pair of leg means pivotally secured to a second pair of corresponding edge portions of said members at corresponding ends for rotation about axes which are generally aligned when said members are in the extended positions and which extend transversely of the first-mentioned axis at all times, each of said leg means being generally L-shaped and includes a medial plane disposed at substantially right angles to its axis of rotation, said leg means each including a short leg and a long leg and being secured to the corresponding panel-like member for rotation extending transversely of the free end of the sort leg thereof, said short legs, when said leg means are in the extended positions, abutting along their length against the corresponding one of said first sides and defining limit positions of movement of said leg means toward said extended positions.

8. A folding car bed platform comprising a pair of similar panel-like members, means pivotally securing said panel-like members together for rotation relative to each other about an axis generally paralleling one pair of corresponding edge portions of said members between unfolded positions in substantially coplanar relation and with one pair of corresponding edge portions disposed in opposed relation and folded positions with said members generally paralleling and registered with each other, a pair of leg means pivotally secured to a second pair of corresponding edge portions of said members at corresponding ends for rotation about axes which are generally aligned when said members are in the extended positions and which extend transversely of the first-mentioned axis at all times, said panel-like members each including four laterally directed peripheral walls disposed at substantially right angles relative to each other and interconnected at adjacent ends, corresponding ones of said peripheral walls having a total width equal to the distance between said panel-like members when the latter are in the folded positions whereby said peripheral walls and said panel-like members together form a closed hollow receptacle in which to enclose said leg means when said panel members are in the folded positions, said members each including a wedge-shaped foot generally parallelling said axis and projecting outwardly from the corresponding one of said first sides, said feet including inclined faces extending longitudinally thereof, facing away from said one sides, and inclined away from said one sides at the end thereof remote from said second pair of corresponding edge portions of said members, said inclined faces being adapted to rest upon the upper surface of a vehicle rear seat cushion extending from front to rear thereof and with the major end portions of said wedge-shaped feet disposed rearmost on said cushion, said wedge-shaped feet also being received in said receptacle when said panel-like members are in the folded positions.

9. The combination of claim 8 including a foldable cover pad of a size and shape corresponding to that of the platform formed by said panel-like members when in the unfolded positions, and means removably securing said pad over the sides of said members remote from said first sides thereof at the opposite ends of said platform.

10. The combination of claim 9 wherein said pad, when folded, and said leg means, when retracted, are receivable between said first sides of said members when the latter are in their folded positions.

11. The combination of claim 10 wherein said wedge-shaped feet are spaced laterally of each other when said panel-like members are folded and also project outwardly beyond the free edge portions of the corresponding ones of said peripheral walls.

12. A collapsible support structure comprising a pair of similar panel-like members including a pair of corresponding generally parallel edge portions along and to which a pair of generally right angled laterally directed walls extend and are secured, two sets of a purality of axially aligned sleeves carried by the free edge portions of said walls and extending longitudinally thereof, said sets of sleeves being axially spaced apart, an elongated handle including a pair of opposite end and axially aligned axle pins, said axle pins being rotatably received through said sets of sleeves and pivotally securing said walls together along their free edge portions, said handle including a laterally offset lip portion disposed between said axle pins whereby said support leg may be supported by said handle when said support structure is collapsed with said wall substantially coplanar and said panel-like members substantially paralleling each other.

13. The combination of claim 12 wherein said mid-portion of said handle generally parallels said axle pins and is laterally spaced from the axis of rotation of said pins a distance less than the distance between said axis and either of said panel-like members, said mid-portion having a width substantially equal to the spacing between the free edge portions of said walls when said support structure is extended with said walls generally paralleling each other and said panel-like members are substantially coplanar, said mid-portion comprising abutment means engageable by the adjacent portions of the confronting surfaces of said walls when said support structure is in the extended position.

References Cited in the file of this patent

UNITED STATES PATENTS

| 2,609,073 | McLaughlin | Sept. 2, 1952 |
| 2,711,545 | Moore | June 28, 1955 |
| 3,011,182 | Burks | Dec. 5, 1961 |
| 3,063,064 | Mace | Nov. 13, 1962 |

FOREIGN PATENTS

| 1,201,195 | France | July 6, 1959 |